(12) United States Patent
Chen

(10) Patent No.: US 11,443,498 B2
(45) Date of Patent: Sep. 13, 2022

(54) TARGET OBJECT RECOGNITION METHOD AND APPARATUS, STORAGE MEDIUM, AND ELECTRONIC DEVICE

(71) Applicant: Tencent Technology (Shenzhen) Company Limited, Shenzhen (CN)

(72) Inventor: Bingwen Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 100 days.

(21) Appl. No.: 17/074,502

(22) Filed: Oct. 19, 2020

(65) Prior Publication Data
US 2021/0034901 A1 Feb. 4, 2021

Related U.S. Application Data

(63) Continuation of application No. PCT/CN2019/110058, filed on Oct. 9, 2019.

(30) Foreign Application Priority Data
Oct. 15, 2018 (CN) .......................... 201811197547.X

(51) Int. Cl.
G06T 7/90 (2017.01)
G06V 10/143 (2022.01)
G06V 20/52 (2022.01)

(52) U.S. Cl.
CPC .............. G06V 10/143 (2022.01); G06T 7/90 (2017.01); G06V 20/52 (2022.01);
(Continued)

(58) Field of Classification Search
CPC .... G06T 7/90; G06T 2207/20081; G06K 9/34
See application file for complete search history.

(56) References Cited

U.S. PATENT DOCUMENTS

2008/0056568 A1* 3/2008 Porikli ...................... G06T 5/50
382/173
2014/0375821 A1 12/2014 Wu et al.

FOREIGN PATENT DOCUMENTS

CN 101727665 A 6/2010
CN 103402044 A 11/2013
(Continued)

OTHER PUBLICATIONS

Tencent Technology, ISR, PCT/CN2019/110058, dated Jan. 14, 2020, 2 pgs.
(Continued)

Primary Examiner — Myron Wyche
(74) Attorney, Agent, or Firm — Morgan, Lewis & Bockius LLP

(57) ABSTRACT

This application discloses a target object recognition method and apparatus, a storage medium, and an electronic device. The method includes: obtaining a first image and a second image, the first image being an image obtained by shooting a target scene under visible light, and the second image being an image obtained by shooting the target scene under infrared; determining a predicted infrared intensity value corresponding to a pixel point in the first image through a prediction model; obtaining a difference between an actual infrared intensity value of a pixel point in the second image and the infrared intensity value corresponding to the pixel point at the same location in the first image; and determining a pixel point in the second image of which the difference is greater than a first threshold as a pixel point at which the target object in the target scene is located.

20 Claims, 7 Drawing Sheets

(52) U.S. Cl.
CPC ............... *G06T 2207/10048* (2013.01); *G06T 2207/10152* (2013.01); *G06T 2207/20081* (2013.01); *G06T 2207/30232* (2013.01)

(56) References Cited

FOREIGN PATENT DOCUMENTS

| | | |
|---|---|---|
| CN | 104778722 A | 7/2015 |
| CN | 105575034 A | 5/2016 |
| CN | 108280819 A | 7/2018 |
| CN | 108509892 A | 9/2018 |
| CN | 108510556 A | 9/2018 |
| CN | 109461168 A | 3/2019 |

OTHER PUBLICATIONS

Tencent Technology, WO, PCT/CN2019/110058, dated Jan. 14, 2020, 4 pgs.
Tencent Technology, IPRP, PCT/CN2019/110058, dated Apr. 14, 2021, 5 pgs.
Extended European Search Report, EP19873881.7, dated Nov. 15, 2021, 9 pgs.

\* cited by examiner

Target object

TARGET OBJECT RECOGNITION METHOD AND APPARATUS, STORAGE MEDIUM, AND ELECTRONIC DEVICE

CROSS REFERENCE TO RELATED APPLICATIONS

This application is a continuation application of PCT Patent Application No. PCT/CN2019/110058, entitled "TARGET OBJECT IDENTIFICATION METHOD AND APPARATUS, STORAGE MEDIUM AND ELECTRONIC APPARATUS" and filed on Oct. 9, 2019, which claims priority to Chinese Patent Application No. 201811197547.X, filed with the State Intellectual Property Office of the People's Republic of China on Oct. 15, 2018, and entitled "TARGET OBJECT RECOGNITION METHOD AND APPARATUS, STORAGE MEDIUM, AND ELECTRONIC DEVICE", all of which are incorporated herein by reference in their entirety.

FIELD OF THE TECHNOLOGY

This application relates to the field of image processing, and specifically, to target object recognition.

BACKGROUND OF THE DISCLOSURE

Moving target detection is to detect a changing region in sequential images and extract the moving object from a background image. Generally, in processes of post-processing such as target classification, tracking, and behavior understanding, only a pixel region corresponding to the moving object in an image is considered. Therefore, correct detection and segmentation of the moving object are of great importance to the post-processing. However, due to impact of dynamic changes of a scene, such as weather, illumination, shadow, and miscellaneous background interference, the detection and segmentation of the moving object become quite difficult.

SUMMARY

Embodiments of this application provide a target object recognition method and apparatus, a storage medium, and an electronic device, to resolve at least the technical problem of relatively low accuracy of target object recognition in the related art.

According to an aspect of the embodiments of this application, a target object recognition method is provided and includes: obtaining a first image and a second image, the first image being an image obtained by shooting a target scene under visible light, and the second image being an image obtained by shooting the target scene under infrared; determining a predicted infrared intensity value of a pixel point in the first image through a prediction model; determining differences between predicted infrared intensity values of pixel points in the first image and actual infrared intensity values of corresponding pixel points in the second image; and determining a pixel point in the second image of which the difference between the predicted infrared intensity value in the first image and the actual infrared intensity value in the second image is greater than a first threshold as a pixel point of the target object located in the target scene.

According to another aspect of the embodiments of this application, a non-transitory computer-readable storage medium is further provided. The non-transitory computer-readable storage medium includes a plurality of computer programs stored therein, the computer programs, when run, performing the foregoing method.

According to another aspect of the embodiments of this application, an electronic device is further provided and includes a memory, a processor, and a plurality of computer programs that is stored in the memory and is executed by the processor, the processor performing the foregoing method by using the plurality of computer programs.

In the embodiments of this application, by using adaptive function reconstruction, a non-linear prediction model used for representing a background of a target scene can be effectively built, information about infrared light and about visible light can be effectively fused, shadow interference and the infrared halo effect can be suppressed, and background clutters can be suppressed to highlight the target, so that the technical problem of relatively low accuracy of target object recognition in the related art can be resolved, and further, the target object can still be accurately recognized in a case of interference.

BRIEF DESCRIPTION OF THE DRAWINGS

The accompanying drawings described herein are used to provide further understanding of this application, and form a part of this application. Exemplary embodiments of this application and descriptions thereof are used for explaining this application, and do not constitute any inappropriate limitation to this application. In the accompanying drawings.

DESCRIPTION OF EMBODIMENTS

To make solutions of this application more comprehensible for a person skilled in the art, the technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The terms such as "first" and "second" in the specification, the claims and the foregoing accompanying drawings of this application are intended to distinguish between similar objects, but are not necessarily used for describing a specific sequence or a chronological order. It is to be understood that the data termed in such a way is interchangeable in proper circumstances, so that the embodiments of this application described herein can be implemented in orders other than the order illustrated or described herein. Moreover, the terms "include", "contain" and any other variant thereof are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

With the development of science and technologies, the progress of society, and the improvement of people's living standards, security awareness of groups and individuals is increasingly enhanced, and the application of video monitoring systems is becoming increasingly extensive. In addition, in the field of artificial intelligence, intelligent recognition of humans, animals, and the like is becoming increasingly common. In the field of monitoring, artificial intelligence, and the like, the target object cannot be accurately detected in the presence of dynamic changes of a scene, such as weather, illumination, shadow, and miscellaneous background interference.

In order to overcome problems in the foregoing scenes, according to an aspect of the embodiments of this application, a method embodiment of a target object recognition method is provided.

Figure 1:
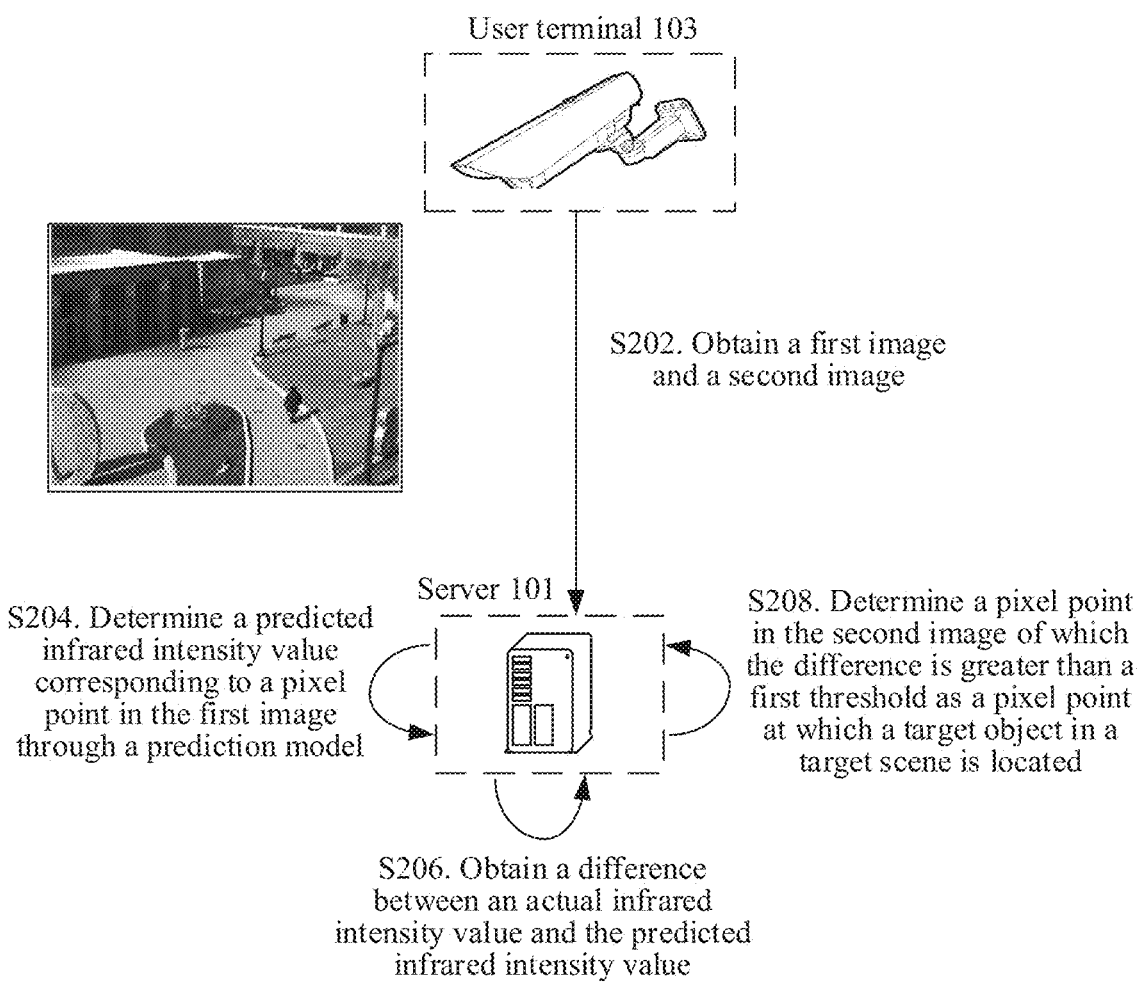
FIG. 1 is a schematic diagram of a hardware environment of a target object recognition method according to an embodiment of this application.

Optionally, in this embodiment, the foregoing target object recognition method may be applied to a processing device, and the processing device may include a terminal and/or a server. For example, in a hardware environment composed of a server 101 and a user terminal 103 as shown in FIG. 1, the processing device includes the server 101. As shown in FIG. 1, the server 101 is connected to the terminal 103 through a network. The foregoing network includes, but is not limited to, a wide area network, a metropolitan area network, or a local area network (such as a property internal network or an enterprise internal network). The terminal 103 is a terminal that may perform visible light image shooting and infrared light image shooting, and includes but is not limited to a visible light surveillance camera, an infrared light surveillance camera, a mobile phone with a camera, and a tablet computer with a camera. The server is a device configured to perform surveillance video storage and/or surveillance video analysis.

The foregoing hardware environment may be a hardware environment of a security monitoring system, an automatic monitoring system and a remote monitoring system in areas such as a bank, a museum, a traffic road, a commercial institution, a military agency, a public security bureau, an electric power sector, a factories and mines sector, an intelligent community, and a space exploration institution. The terminal may be a high-definition camera and an infrared camera located at the same location in the systems. The server may be a server in a system central control room, to implement intelligent target detection and target tracking by using a computer.

The foregoing hardware environment may alternatively be a hardware environment in an artificial intelligence system. The terminal may be a visible light sensor and an infrared sensor of intelligent devices, for example, an aircraft in the system. The server may be an Internet server in communication connection to the aircraft. An object appearing in a visible area can be automatically located by using the method according to this application.

Figure 2:
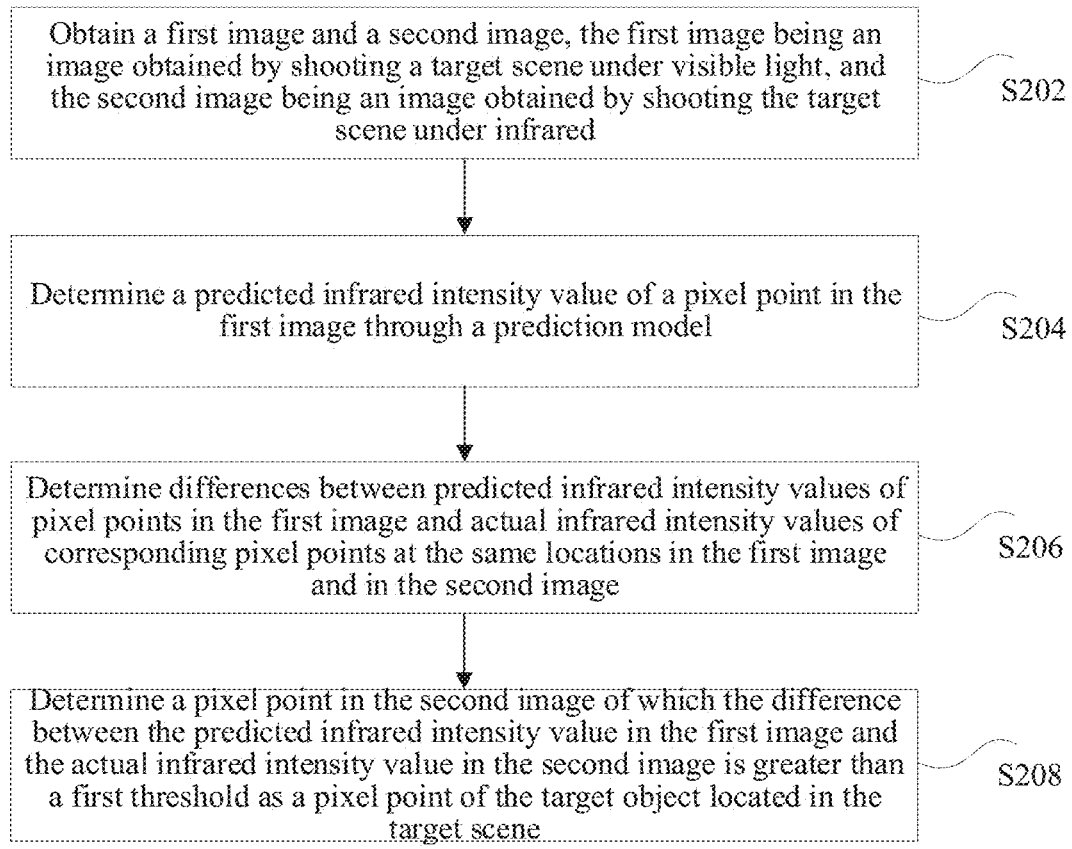
FIG. 2 is a flowchart of an optional target object recognition method according to an embodiment of this application.

When the method according to this application is applied to the field of monitoring, artificial intelligence, and the like, a target object recognition method according to the embodiments of this application may be performed by the server 101 in a monitoring or an artificial intelligence system. FIG. 2 is a flowchart of an optional target object recognition method according to an embodiment of this application. As shown in FIG. 2, the method may include the following steps:

Step S202. A server obtains a first image and a second image, the first image being an image obtained by shooting a target scene under visible light, and the second image being an image obtained by shooting the target scene under infrared.

The foregoing first image and second image may be a frame of a sequence of continuous shot video frames, or may be an image shot alone. The first image and the second image are images of the same framing (that is, the target scene), and the first image and the second image are images shot at close time (that is, a difference between the shooting time is less than a preset value, for example, 0.02 s), for example, the same frames (that is, video frames at the same locations) of a visible-light video frame sequence and an infrared video frame sequence that are obtained through shooting at the same time.

The foregoing target scene is an area in which the target object is to be recognized, and may be a scene of an area monitored by a terminal in a monitoring system or an area that can be recognized currently by an aircraft in an artificial intelligence system.

A visible light sensor can detect spectral energy of red, green and blue and convert the spectral energy into color images. The images have abundant color, texture, structure, and other information, conform to a human visual perception system, and are easy to understand and analyze. A detection system based on an infrared sensor can receive infrared radiation from a target and a background, convert invisible radiation into an image that can be observed by human eyes, has good environmental adaptability and high sensitivity, and is suitable for detection and recognition of a weak target signal. In addition, an infrared sensing device has extremely weak infrared radiation, is a passive detection device, and has good invisibility. Therefore, the target and scene information can be effectively enriched by combining a visible light image and an infrared light image, to improve the detection rate.

Step S204. The server determines a predicted infrared intensity value of a pixel point in the first image through a prediction model.

In a possible implementation, the prediction model is a model obtained through training by using a group of third images shot under the visible light as an input of the model and using a group of fourth images shot under the infrared as an output of the model, the group of third images and the group of fourth images being images of the same scene.

During the model training, the objective of the training is to enable the model to convert the visible light image into the infrared image of the same scene. In other words, the prediction model can convert the first image into an infrared image, a predicted infrared intensity value of each pixel point in the infrared image being determined by using a color value of the pixel point at the same location in the first image.

The foregoing prediction model includes a plurality of prediction functions (which may be basis functions) allocated with corresponding weights. Inputs of the prediction functions are an input of the prediction model, and an output of the prediction model is a cumulative sum of products of outputs of all the prediction functions and corresponding weights.

Step S206. The server determines differences between predicted infrared intensity values of pixel points in the first image and actual infrared intensity values of corresponding pixel points in the second image.

Step S208. The server determines a pixel point in the second image of which the difference between the predicted infrared intensity value in the first image and the actual infrared intensity value in the second image is greater than a first threshold as a pixel point of the target object located in the target scene.

The foregoing embodiment is described by using an example in which the target object recognition method in this embodiment of this application is performed by the server 101. The target object recognition method in this embodiment of this application may alternatively be performed by the terminal 103. The target object recognition method in this embodiment of this application may further be jointly performed by the server 101 and the terminal 103. The terminal 103 performs step S202, and the server 101 performs the remaining steps. The target object recognition method to be performed by the terminal 103 in this embodiment of this application may also be performed by a client installed on the terminal.

In step S202 to step S208, by using adaptive function reconstruction, a non-linear prediction model used for representing a background of a target scene can be effectively built, information about infrared light and about visible light can be effectively fused, shadow interference and the infrared halo effect can be suppressed, and background clutters can be effectively suppressed to highlight the target, so that the technical problem of relatively low accuracy of target object recognition in the related art can be resolved, and further, the target object can still be accurately recognized in a case of interference.

The following further describes the technical solution of this application in detail by using an intelligent community as an example.

In the technical solution provided in step S202, in an intelligent community, the community may be divided into several sub-areas. The terminal used for monitoring each sub-area can monitor the sub-area in real time. The infrared video and visible light video acquired by the terminal are transmitted to a server of a central control room of the community in real time, to automatically monitor the community. After receiving the infrared video and visible light video, the server obtains, by parsing the visible light video, the first image of the target scene (that is, the scene of the area monitored by the terminal) under the visible light, for example, the acquired plurality of first images of the scene shown in FIG. 3, and obtains, by parsing the infrared video, the second images of the target scene under the infrared, for example, the acquired second images shown in FIG. 4 in one-to-one correspondence to the first images in FIG. 3. The location of the first image in the visible light video is the same as the location of the second image in the infrared video (the first image and the second image may be considered as images at the same frame locations, for example, the first image on the top left corner in FIG. 3 and the second image on the top left corner in FIG. 4), that is, the first image obtained by shooting the target scene under the visible light and the second image obtained by shooting the target scene under the infrared at the same moment are obtained.

In the technical solution provided in step S204, the server determines the predicted infrared intensity value corresponding to the pixel point in the first image through the prediction model, the prediction model being a model obtained through training by using the group of third images shot under the visible light as the input of the model and using the group of fourth images shot under the infrared as the output of the model, and the group of third images and the group of fourth images being images of the same scene.

The foregoing prediction model may be trained in advance, or may be trained when step S204 is performed. An optional training method is shown in step 11 to step 14.

Step 11. Obtain, before the predicted infrared intensity value corresponding to the pixel point in the first image is determined through the prediction model, the group of third images and the group of fourth images obtained by shooting the target scene.

An image used during the training is an image including at least the target scene, in other words, may be an image including only the target scene, or an image including the target scene and another neighboring scene.

The number of images of the foregoing group of third images is the same as the number of images of the foregoing group of fourth images, and the images of the group of third images are in one-to-one correspondence to the images of the group of fourth images, in other words, each third image has a fourth image with the same framing content.

Step 12. Train an original model by using an image of the group of third images as an input of the original model frame by frame and by using an image of the same frame (or referred to as the same framing content) of the group of fourth images as an output of the original model.

Optionally, the training an original model by using an image of the group of third images as an input of the original model frame by frame and by using an image of the same frame of the group of fourth images as an output of the original model includes step S121 to step S122.

Step S121. Input a color value of a pixel point in the third image into the original model, and use an intensity value of a pixel point in the fourth image of the same frame as the output of the original model, the color value of the pixel point in the third image being used as an input of a plurality of prediction functions of the original model, and the output of the original model being a cumulative sum of products of all of the plurality of prediction functions and corresponding weights.

In the embodiment shown in step S121, a color type of the pixel point in the third image is converted into a color type based on a physiological characteristic, in a case that the color type of the pixel point in the third image is not the color type based on a physiological characteristic (for example, a Lab color value type), and then a color value of a first color channel (for example, a channel a) and a color value of a second color channel (for example, a channel b) of the pixel point in the third image after the color type conversion are inputted into the prediction model.

The foregoing prediction function may be a basis function. In mathematics, the basis function is elements of a set of special bases in a function space. A continuous function (for example, a function used for representing a model) in the function space may be represented by a linear combination of a series of basis functions, like that each vector in a vector space may be represented by a linear combination of basis vectors.

The basis function may be represented by $$f_i(x) = \prod_{j=1}^{d} x_j^{r_{ij}},$$

where $a_i$ represents a weight of an $i^{th}$ basis function $f_i(x)$, $x_j^{r_{ij}}$ represents a $j^{th}$ parameter of the basis function, $r_{ij}$ is preset, for example, $r_{i1}$ is 0.1, $r_{i2}$ is 1, and $r_{i3}$ is 2, and d is an integer used for representing an upper limit of the value of j, that is, the number of model input features.

A function representing a target model may be represented by $\hat{y}=\Sigma_{i=1}^{k} a_i f_i(x)$, k representing the number of basis functions, $\hat{y}$ representing a predicted value, and $f_i(x)$ representing a basis function, that is, the product of powers of input features.

Step S122. Initialize, by using the color value of the pixel point in the third image and the intensity value of the pixel point in the fourth image of the same frame, the weights corresponding to the prediction functions and parameters inside the prediction functions, to complete training the original model. That is, a to-be-determined parameter in the function is solved through an internal activation function by using the color value of a pixel point in the third image as a value of x in $f_i(x)$ and using the intensity value of a pixel point in the fourth image as a value of $\hat{y}$.

Step 13. After a quantity of times of the training reaches a particular number, confirm, by using a test image shot under the visible light as an input of an original model after the training and determining whether a predicted image outputted by the original model matches a verification image shot under the infrared, whether fitting of parameters during the training is completed.

Step 14. Use the original model after the training as the prediction model, in a case that the test image shot under the visible light is used as the input of the original model after the training and the predicted image outputted by the original model matches the verification image shot under the infrared, that is, a similarity between the predicted image and the verification image reaches a threshold (for example, 99%), the test image and the verification image being images of the same framing area in the target scene.

Similarity solving may be implemented by comparing an intensity value q1 of each pixel point in the predicted image with an intensity value q2 of a pixel point at the same location in the verification image. If |q2−q1|/q2 is greater than a fixed threshold (for example, 95%), the pixel points are considered as the same pixel points. The similarity may be represented by a ratio of a quantity n of the same pixel points in the predicted image and the verification image to a quantity m of pixel points in the verification image.

Step 15. Train the original model by continuing to use the image of the group of third images as the input of the original model and by using the image of the same frame of the group of fourth images as the output of the original model, in a case that the test image is used as the input of the original model after the training, and the predicted image outputted by the original model does not match the verification image, until the predicted image outputted by the original model after the training matches the verification image.

In the foregoing training process, the group of third images used are background images under irradiation of visible light, and the group of fourth images are background images in the same framing area under irradiation of infrared light. After the training of the model is completed by using the foregoing method, the model can establish a background model. If input data of the model is a background pixel point, a predicted output value of the model is close to an infrared value of the background pixel point. When a pixel point of the target object is inputted, a difference between a predicted infrared intensity value and the infrared value of the background pixel point is large. Therefore, the model can be used for object recognition. Optionally, determining the predicted infrared intensity value corresponding to the pixel point in the first image through the prediction model may include the following steps:

Step S21. Input a color value of the pixel point in the first image into the prediction model.

In the embodiment shown in step S21, when the color value of the pixel point in the first image is inputted into the prediction model, it can be determined whether a color type of the pixel point in the first image is a color type based on a physiological characteristic. If yes, the color value is inputted directly. If not, that is, in a case that the color type of the pixel point in the first image is not the color type based on a physiological characteristic, the color type of the pixel point in the first image is converted into the color type based on a physiological characteristic, and then a color value of a first color channel and a color value of a second color channel of the pixel point in the first image after the color type conversion are inputted into the prediction model.

Step S22. Invoke various types of prediction functions in the prediction model, and determine, according to the color value of the pixel point in the first image, the predicted infrared intensity value corresponding to the pixel point at the same location in the first image.

That is, the color value of the pixel point in the first image is used as a value of x in $f_i(x)$, and a value of an intensity value $\hat{y}$ of each pixel point is solved by using parameters of the function, to complete prediction.

In the technical solution provided in step S206, the server obtains the difference between the actual infrared intensity value of the pixel point in the second image and the predicted infrared intensity value corresponding to the pixel point at the same location in the first image. If input data of the model is a background pixel point, a predicted output value of the model is close to an infrared value of the background pixel point. In other words, a difference between the actual infrared intensity value of the pixel point in the second image and the predicted infrared intensity value corresponding to the pixel point at the same location in the first image is small and is less than a first threshold, and a difference between an infrared intensity value obtained through prediction after a pixel point of the target object is inputted and an infrared value of the background pixel point is large and is greater than the first threshold. Therefore, whether a pixel point is a pixel point on the target object can be determined through the difference.

In the technical solution provided in step S208, the server determines the pixel point in the second image of which the difference is greater than the first threshold as the pixel point at which the target object in the target scene is located.

Figure 5:
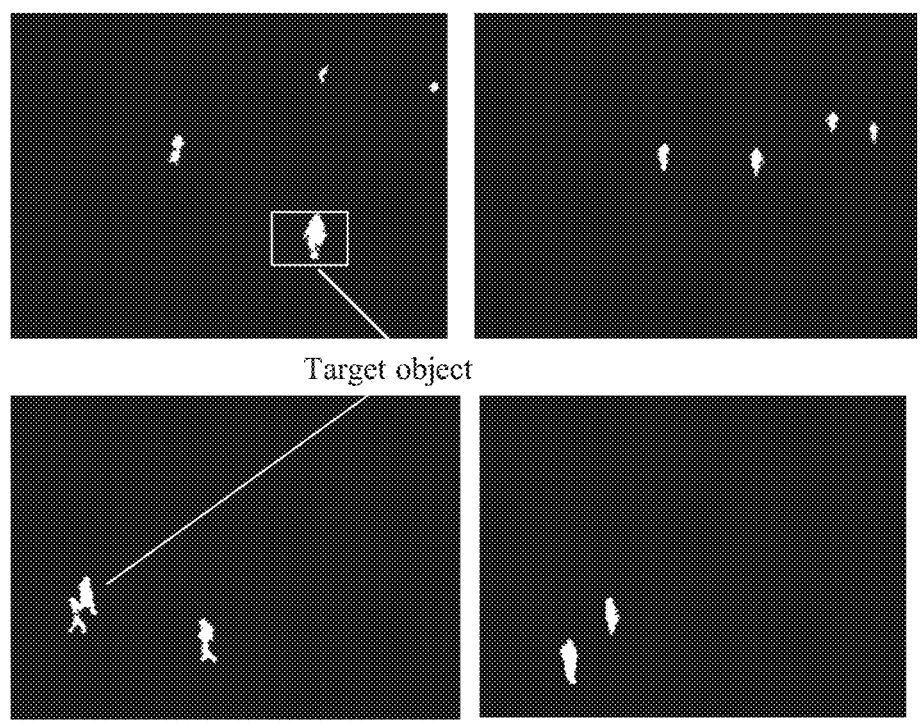
FIG. 5 is a schematic diagram of an optional scene target object according to an embodiment of this application.

Optionally, determining the pixel point in the second image of which the difference is greater than the first threshold as the pixel point at which the target object in the target scene is located includes: traversing each pixel point in the second image, setting an intensity value of the pixel point in the second image of which the difference is greater than the first threshold as a second threshold (for example, an intensity value corresponding to white), and setting an intensity value of a pixel point in the second image of which the difference is not greater than the first threshold as a third threshold (for example, an intensity value corresponding to black), the second threshold and the third threshold being different thresholds; and describing, after traversing all the pixel points in the second image, the target object through the pixel point in the second threshold of which the intensity value is the second threshold. As shown in FIG. 5, each image in FIG. 5 corresponds to one of four images in FIG. 3.

Figure 6:
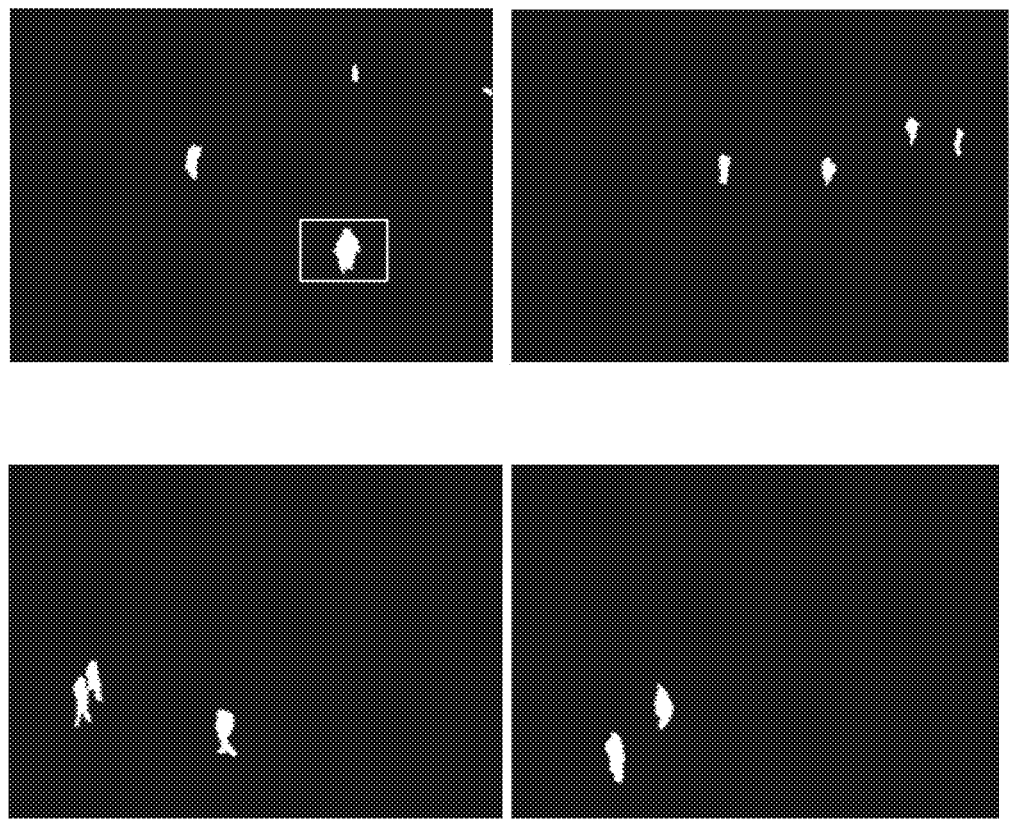
FIG. 6 is a schematic diagram of an optional scene target object according to an embodiment of this application.

In the related technical solutions, the detection effect achieved is shown in FIG. 6. By using the target objects marked by white boxes respectively in the top left corner images in FIG. 5 and FIG. 6 as an example, shadow interference, the halo effect in an infrared image, man-made interference, and the like can be removed by using the technical solution of this application, so that the profile of the target object is clearer. In the technical solution of this application, information about infrared and about visible light can be effectively fused, shadow interference and the infrared halo effect can be suppressed, and background clutters can be effectively suppressed to highlight the target.

In an optional embodiment, the technical solution of this application is described in detail with reference to the specific implementations.

In an optional embodiment, when detection of a moving target in a visible light image is performed, a region of interest (ROI) grayscale image in a current frame may be obtained by setting a ROI frame in a grayscale image in an $N^{th}$ frame. After image preprocessing, binary image processing, binary image inversion processing, and image expansion processing are performed on the ROI grayscale image in the current frame, a method for obtaining a target image by screening a connected area by using a screening method is further used, so that the problems that a traditional target detection method is not suitable for target detection in the moving background and that the target is lost when the target passes through the moving background can be resolved, and the real-time performance and accuracy of moving target detection in the moving background are guaranteed.

Infrared remote sensing detects and locates the target by receiving heat energy radiated by the target, reflects the radiation characteristics of a scene, and has strong anti-interference capability and recognition capability. However, when the contrast is low, it is possible to miss some targets with small heat radiation and make false detection on some background areas with high brightness. However, the visible light image represents reflection characteristics of the scene, has a good image contrast and rich grayscale distribution, but the visible light image has strong dependence on illumination and working time is limited.

In the related art, infrared and visible light collaborative target detection method may be roughly divided into two categories: collaborative target detection based on fusion first and detection later and collaborative target detection based on detection first and fusion later. According to the infrared and visible light collaborative target detection method based on fusion first and detection later, the infrared and visible images are integrated into a fused image according to a fusion policy to highlight the target and enhance the contrast of the scene, and then a detection solution is formulated according to the fusion situation, to detect the target. The method focuses on the formulation of an efficient fusion model, for example, a non-parametric model, a codebook model, and a model of a histogram of oriented gradient are used for distinguishing various targets based on the probability fusion theory. According to the infrared and visible light collaborative target detection method based on detection first and fusion later, the fusion is performed after single-source target detection is performed. First, a target detection task of a single data source is performed according to a data source type, and then a fusion policy (mostly the probability fusion policy or threshold fusion policy) is formulated, to adjust respective detection results to obtain the target. Such a method focuses on the research of a robust background model and salient features, such as a dual-feature mixed parameter background model and salient features of a contour map.

The main idea of the foregoing implementation is to detect a target by using morphology operation and an adaptive threshold algorithm. The foregoing implementation is not suitable for a complex outdoor scene (for example, a scene with a background in which trees swing in the presence of wind, or a scene with building interference) that easily causes a false alarm and a low detection rate. In a case that there is shadow interference in the visible light image and a halo effect in the infrared image, and man-made interference, technical problems such as a false alarm and a low target detection rate are easily caused.

In order to overcome defects of the foregoing implementation, this application further provides an implementation, that is, an infrared and visible light collaborative target detection method based on adaptive basis function reconstruction. A collaborative background model M (that is, a prediction model) is built by obtaining several frames of image $BG^v$ (that is, a group of third images) of a visible light video and several frames of image $BG^r$ (that is, a group of fourth images) of an infrared video. For the background model M obtained in the foregoing step, background clutter suppression is performed with reference to a current frame $F_t$ (including a first image under visible light and a second image under infrared light), and a background suppression image $G_t$ (a predicted intensity value of each pixel point in $G_t$ is obtained through prediction by using a pixel point in the first image) after the background clutter suppression is obtained. A target is detected by using an adaptive threshold segmentation algorithm. By using an adaptive function reconstruction technology, a non-linear background model can be effectively built, information about infrared light and about visible light can be effectively fused, shadow interference and the infrared halo effect can be suppressed, and background clutters can be effectively suppressed to highlight the target.

The infrared and visible light collaborative target detection method based on adaptive basis function reconstruction in this application may actually be deployed on a server invoked by using an application programming interface (API) service or invoked by means of nesting a software development kit (SDK). The server may be implemented with reference to an action implementation scene. An algorithm may be run in a system environment such as Linux or Windows of the server.

The technical solution in this application is further described with reference to the accompanying drawings and specific embodiments.

Figure 3:
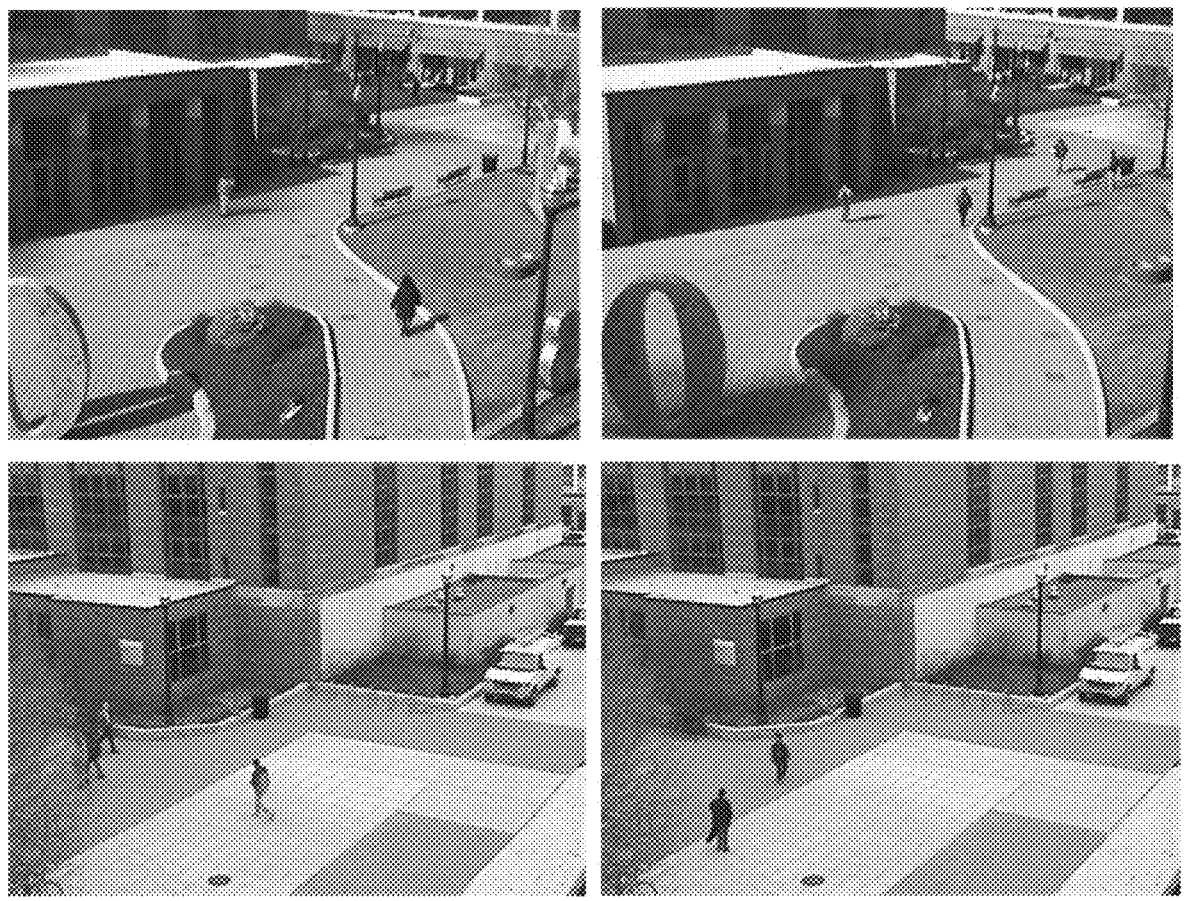
FIG. 3 is a schematic diagram of an optional scene visible light image according to an embodiment of this application.
Figure 4:
FIG. 4 is a schematic diagram of an optional scene infrared image according to an embodiment of this application.
Figure 7:
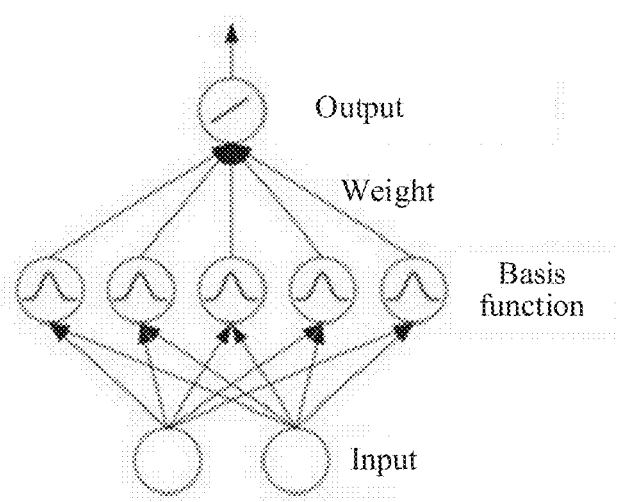
FIG. 7 is a schematic diagram of an optional prediction model according to an embodiment of this application.

Step 1. Obtain the several frames of image $BG^v$ of a visible light video, as shown in FIG. 3, and the several frames of image $BG^r$ of an infrared video, as shown in FIG. 4, to establish the collaborative background model M, the background model M being obtained based on the adaptive basis function reconstruction technology. FIG. 7 shows a schematic diagram of an optional background model.

A background model is established by allocating image data ($F_t$, t=1 . . . T) of T frames, the T frames including an infrared part $F^t_r$ and a visible light part $F^v_r$, and a background model $M(i, j)$ is established for a location of each pixel point.

Step 11. Convert RGB values of the visible light into Lab color values, use color values of a and b as input features of the model, for example, an input shown in FIG. 7, and use an infrared intensity value as an output of the model, for example, an output shown in FIG. 7, to jointly form T training samples X.

Step 12. Establish, for the training samples X obtained in step 11, the background model $M(i, j)$ by using the adaptive basis function reconstruction technology, $$\hat{y} = \sum_{i=1}^{k} a_i f_i(x),$$

$$f_i(x) = \prod_{j=1}^{d} x_j^{r_{ij}},$$

where $a_i$ represents a weight of a basis function, k represents the number of the basis functions, $\hat{y}$ represents a predicted value, d represents the number of input features of the model, and $f_i(x)$ represents the basis function, that is, a product of powers of the input features.

Step 2. Perform, for the background model M obtained in step 1, the background clutter suppression with reference to the current frame $F_t$, to obtain the background suppression image $G_t$ after the background clutter suppression, that is, an image composed of differences between predicted infrared intensity values obtained by performing prediction for the pixel points in the visible light image (that is, the first image) in the current frame and actual infrared intensity values, and detect the target by using the adaptive threshold segmentation algorithm.

Step 21. Obtain the background suppression image $G_t$ for the background model obtained in step 1:

$$G_t = \text{abs}(F_t - \hat{Y}),$$

that is, obtain an absolute difference between an intensity value of an infrared image in the current frame and a predicted value of the background model, as shown in FIG. 4.

Step 22. Calculate a threshold θ by using an adaptive threshold algorithm such as an OTSU threshold algorithm, to extract the target.

$$D(i, j) = \begin{cases} 1, & G(i, j) > \rho, \\ 0, & \text{otherwise} \end{cases}.$$

In the technical solutions of this application, by using an adaptive function reconstruction technology, a non-linear background model can be effectively built, information about infrared light and about visible light can be effectively fused, shadow interference and the infrared halo effect can be suppressed, and background clutters can be effectively suppressed to highlight the target.

Figure 8:
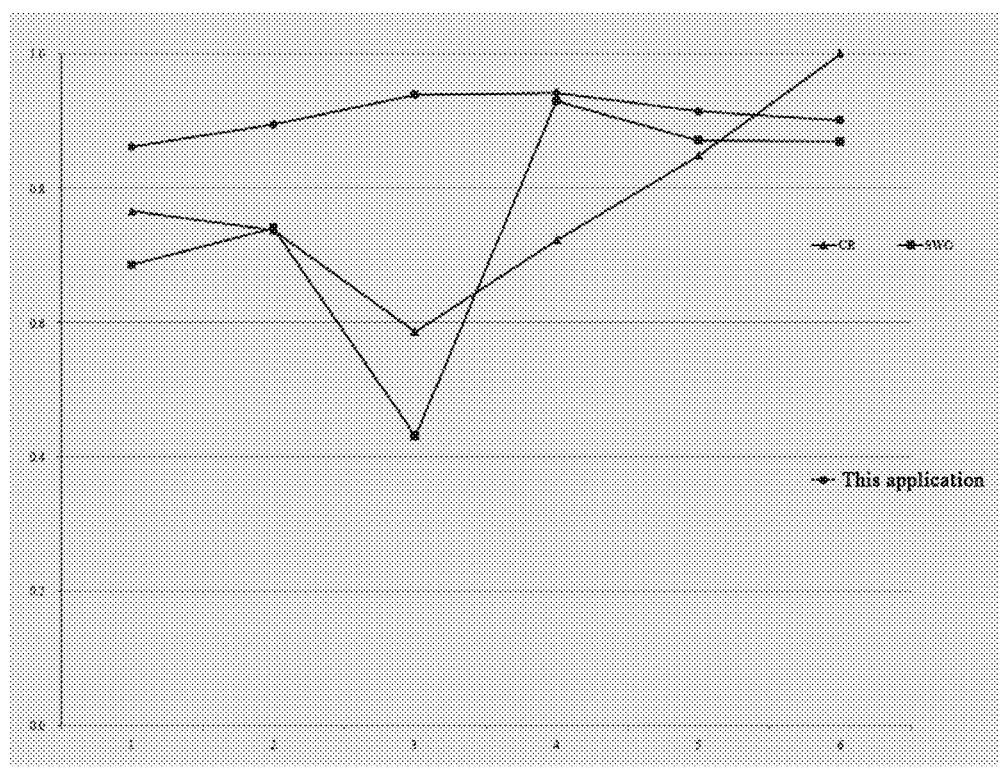
FIG. 8 is a schematic diagram of an optional prediction result according to an embodiment of this application.

In order to verify the effectiveness of this method, in this application, a verification experiment is conducted by using six actually acquired videos of complex outdoor scenes, referring to FIG. 3 and FIG. 4, and verification is performed by comparing with another algorithm, as shown in FIG. 8 and Table 1. It is verified that: in the technical solution of this application, targets in different complex scenes can be effectively detected; compared with a codebook (CB) method and a weighted single Gaussian (WSG) method, a comprehensive index F1 (an evaluation index) of this solution is as high as 90.9% (that is, the relatively flat curve at the top). This solution can better suppress the interference from visible light shadows and infrared halo effects, and has good detection stability and strong scene adaptability. Comparison between average indexes of three detection methods is shown in Table 1.

TABLE 1

|  | Recall | Precision | F1 |
|---|---|---|---|
| Codebook | 0.7996 | 0.7710 | 0.7774 |
| Weighted single Gaussian | 0.8784 | 0.6675 | 0.7551 |
| This method | 0.9162 | 0.9024 | 0.9093 |

In order to verify the effectiveness of this method, in this application, comparative verification is performed by using some other methods. Two algorithms namely, the CB method and the SWG method, are compared.

Detection results of the three detection methods, namely, the foregoing two methods and the method of this application, for outdoor scenes are shown in FIG. 8 and Table 1. This method can effectively suppress shadows and halo effects and effectively detect targets in different scenes.

In order to evaluate the detection performance of this method more objectively, standard generalized indexes of Precision, Recall and F1 in the field of target detection are used for evaluating the detection result of this method. Recall represents a detection rate, which is a ratio of the number of detected real targets to the total number of real targets. Precision represents an accuracy rate, which is a ratio of the number of the detected real targets to the total number of detected targets. A good target detection method is to have a high Recall value and also maintain a high Precision value at the same time. A higher F1 value also means good detection performance.

Evaluation results of the three indexes of the three detection methods are shown in FIG. 8 and Table 1. From the table, the overall detection performance of various detection algorithms can be compared: the weighted single Gaussian algorithm has a higher detection rate, but the accuracy rate is lower, and the codebook algorithm is poor in the detection rate and accuracy rate. The method in this application has a relatively high detection rate, a high accuracy rate, and good detection stability, and the F1 index of this method is as high as 90.9%.

To make the description simple, the foregoing method embodiments are stated as a series of action combinations. However, a person skilled in the art needs to learn that this application is not limited to the described sequence of the actions, because some steps may use another sequence or may be simultaneously performed, according to this application. In addition, a person skilled in the art needs to know that, the embodiments described in the specification are all exemplary embodiments and the related actions and modules are not mandatory to this application. In this application, the term "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof.

Through the descriptions of the foregoing implementations, a person skilled in the art may clearly understand that the method according to the foregoing embodiments may be implemented by means of software and a necessary general hardware platform, and certainly, may also be implemented by hardware, but in many cases, the former manner is a better implementation. Based on such an understanding, the technical solutions of this application essentially, or the part contributing to the related art may be implemented in a form of a software product. The computer software product is stored in a storage medium (for example, a ROM/RAM, a magnetic disk, or an optical disc), and includes several instructions for instructing a terminal device (which may be a mobile phone, a computer, a server, a network device, or the like) to perform the methods according to the embodiments of this application.

Figure 9:
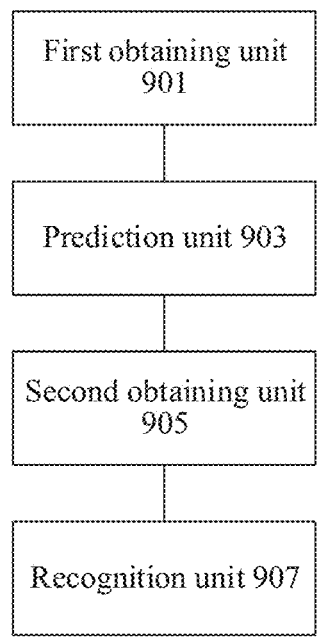
FIG. 9 is a schematic diagram of an optional target object recognition apparatus according to an embodiment of this application.

According to another aspect of the embodiments of this application, a target object recognition apparatus for implementing the foregoing target object recognition method is further provided. FIG. 9 is a schematic diagram of an optional target object recognition apparatus according to an embodiment of this application. As shown in FIG. 9, the apparatus may include: a first obtaining unit 901, a prediction unit 903, a second obtaining unit 905, and a recognition unit 907.

The first obtaining unit 901 is configured to obtain a first image and a second image, the first image being an image obtained by shooting a target scene under visible light, and the second image being an image obtained by shooting the target scene under infrared.

The foregoing first image and second image may be a frame of a sequence of continuous shot video frames, or may be an image shot alone. The first image and the second image are images of the same framing (that is, the target scene), and the first image and the second image are images shot at close time (that is, a difference between the shooting time is less than a preset value, for example, 0.02 s), for example, the same frames (that is, video frames at the same locations) of a visible-light video frame sequence and an infrared video frame sequence that are obtained through shooting at the same time.

The foregoing target scene is an area in which the target object is to be recognized, and may be a scene of an area monitored by a terminal in a monitoring system or an area that can be recognized currently by an aircraft in an artificial intelligence system.

A visible light sensor can detect spectral energy of red, green and blue and convert the spectral energy into color images. The images have abundant color, texture, structure, and other information, conform to a human visual perception system, and are easy to understand and analyze. A detection system based on an infrared sensor can receive infrared radiation from a target and a background, convert invisible radiation into an image that can be observed by human eyes, has good environmental adaptability and high sensitivity, and is suitable for detection and recognition of a weak target signal. In addition, an infrared sensing device has extremely weak infrared radiation, is a passive detection device, and has good invisibility. Therefore, the target and scene information can be effectively enriched by combining a visible light image and an infrared light image, to improve the detection rate.

The prediction unit 903 is configured to determine a predicted infrared intensity value corresponding to a pixel point in the first image through a prediction model, the prediction model being a model obtained through training by using a group of third images shot under the visible light as an input of the model and using a group of fourth images shot under the infrared as an output of the model, and the group of third images and the group of fourth images being images of the same scene.

During the model training, the objective of the training is to enable the model to convert the visible light image into the infrared image of the same scene. In other words, the prediction model can convert the first image into an infrared image, a predicted infrared intensity value of each pixel point in the infrared image being determined by using a color value of the pixel point at the same location in the first image.

The foregoing prediction model includes a plurality of prediction functions (which may be basis functions) allocated with corresponding weights. Inputs of the prediction functions are an input of the prediction model, and an output of the prediction model is a cumulative sum of products of outputs of all the prediction functions and corresponding weights.

The second obtaining unit 905 is configured to obtain a difference between an actual infrared intensity value of a pixel point in the second image and the predicted infrared intensity value corresponding to the pixel point at the same location in the first image.

The recognition unit 907 is configured to determine a pixel point in the second image of which the difference is greater than a first threshold as a pixel point at which the target object in the target scene is located.

The first obtaining unit 901 in this embodiment may be configured to perform step S202 in the embodiments of this application; the prediction unit 903 in this embodiment may be configured to perform step S204 in the embodiments of this application; the second obtaining unit 905 in this embodiment may be configured to perform step S206 in the embodiments of this application; and the recognition unit 907 in this embodiment may be configured to perform step S208 in the embodiments of this application.

Implemented examples and application scenes of the foregoing modules are the same as those of the corresponding steps, but are not limited to the content disclosed in the foregoing embodiments. The foregoing modules may be run in the hardware environment shown in FIG. 1 as a part of the apparatus, and may be implemented by software, or may be implemented by hardware.

Through the foregoing modules, by using adaptive function reconstruction, a non-linear prediction model used for representing a background of a target scene can be effectively built, information about infrared light and about visible light can be effectively fused, shadow interference and the infrared halo effect can be suppressed, and background clutters can be effectively suppressed to highlight the target, so that the technical problem of relatively low accuracy of target object recognition in the related art can be resolved, and further, the target object can still be accurately recognized in a case of interference.

Optionally, a prediction unit may include: an input module, configured to input a color value of the pixel point in the first image into the prediction model; and a prediction module, configured to invoke various types of prediction functions in the prediction model, and determine, according to the color value of the pixel point in the first image, the predicted infrared intensity value corresponding to the pixel point at the same location in the first image.

Optionally, the apparatus in this application may further include: a third obtaining unit, configured to obtain, before the determining of the predicted infrared intensity value corresponding to the pixel point in the first image through the prediction model, a group of third images and a group of fourth images obtained by shooting the target scene; a training unit, configured to train an original model by using an image of the group of third images as an input of the original model frame by frame and by using an image of the same frame of the group of fourth images as an output of the original model; a first verification unit, configured to use the original model after the training as the prediction model, in a case that a test image shot under the visible light is used as an input of the original model after the training and a predicted image outputted by the original model matches a verification image shot under the infrared, the test image and the verification image being images of the target scene; and a second verification unit, configured to train the original model by continuing to use the image of the group of third images as the input of the original model and by using the image of the same frame of the group of fourth images as the output of the original model, in a case that the test image is used as the input of the original model after the training, and the predicted image outputted by the original model does not match the verification image, until the predicted image outputted by the original model after the training matches the verification image.

Optionally, training, by the training unit, the original model by using the image of the group of third images as the input of the original model frame by frame and by using the image of the same frame of the group of fourth images as the output of the original model may be implemented in the following manner: inputting a color value of a pixel point in the third image into the original model, and using an intensity value of a pixel point in the fourth image of the same frame as the output of the original model, the color value of the pixel point in the third image being used as an input of a plurality of prediction functions of the original model, and the output of the original model being a cumulative sum of products of all of the plurality of prediction functions and corresponding weights; initializing the weights corresponding to the prediction functions and parameters inside the prediction functions by using the color value of the pixel point in the third image and the intensity value of the pixel point in the fourth image of the same frame, to complete training the original model.

Optionally, determining, by the recognition unit, the pixel point in the second image of which the difference is greater than the first threshold as the pixel point at which the target object in the target scene is located may be implemented in the following manner: traversing each pixel point in the second image, setting an intensity value of the pixel point in the second image of which the difference is greater than the first threshold as a second threshold, and setting an intensity value of a pixel point in the second image of which the difference is not greater than the first threshold as a third threshold, the second threshold and the third threshold being different thresholds; and describing the target object through the pixel point in the second threshold of which the intensity value is the second threshold after all the pixel points in the second image are traversed.

Optionally, when obtaining the first image and the second image, the first obtaining unit may obtain the first image obtained by shooting the target scene under the visible light and the second image obtained by shooting the target scene under the infrared at the same moment.

By using the technical solution of this application, that is, an infrared and visible light collaborative target detection method based on adaptive basis function reconstruction, a collaborative background model M (that is, a prediction model) is built by obtaining several frames of image $BG^v$ (that is, a group of third images) of a visible light video and several frames of image $BG^t$ (that is, a group of fourth images) of an infrared video. For the background model M obtained in the foregoing step, background clutter suppression is performed with reference to a current frame $F_t$ (including a first image under visible light and a second image under infrared light), and a background suppression image $G_t$ (a predicted intensity value of each pixel point in G is obtained through prediction by using a pixel point in the first image) after the background clutter suppression is obtained. A target is detected by using an adaptive threshold segmentation algorithm. By using an adaptive function reconstruction technology, a non-linear background model can be effectively built, information about infrared light and about visible light can be effectively fused, shadow interference and the infrared halo effect can be suppressed, and background clutters can be effectively suppressed to highlight the target.

Implemented examples and application scenes of the foregoing modules are the same as those of the corresponding steps, but are not limited to the content disclosed in the foregoing embodiments. The foregoing modules may be run in the hardware environment shown in FIG. 1 as a part of the apparatus, and may be implemented by software, or may be implemented by hardware. The hardware environment includes a network environment.

According to another aspect of the embodiments of this application, a server or a terminal configured to implement the foregoing target object recognition method is further provided.

Figure 10:
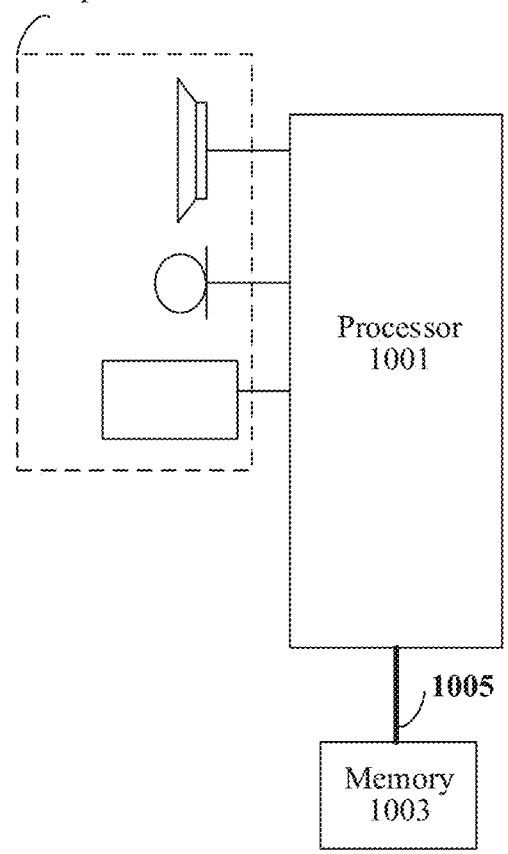
FIG. 10 is a structural block diagram of a terminal according to an embodiment of this application.

FIG. 10 is a structural block diagram of a terminal according to an embodiment of this application. As shown in FIG. 10, the terminal may include one or more processors 1001 (only one processor is shown in the figure), a memory 1003, and a transmission apparatus 1005. As shown in FIG. 10, the terminal may further include an input/output device 1007.

The memory 1003 can be configured to store a software program and a module, for example, a program instruction/module corresponding to the target object recognition method and apparatus in the embodiments of this application, and the processor 1001 performs various functional applications and data processing, that is, implements the foregoing target object recognition method, by running a software program and a module stored in the memory 1003. The memory 1003 may include a high-speed random access memory, and may further include a non-volatile memory, for example, one or more magnetic storage devices, flash memories, or other non-volatile solid state memories. In some embodiments, the memory 1003 may further include memories remotely disposed relative to the processor 1001, and the remote memories can be connected to the terminal through a network. Examples of the foregoing network include but are not limited to, the Internet, an intranet, a local area network, a mobile communication network, and a combination thereof.

The transmission apparatus 1005 is configured to receive or send data by using a network, or may further be configured to transmit data between the processor and the memory. Specific examples of the foregoing network may include a wired network and a wireless network. In an example, the transmission apparatus 1005 includes a network interface controller (NIC). The NIC may be connected to another network device and a router by using a network cable, to communicate with the Internet or the local network. In an example, the transmission apparatus 1005 is a radio frequency (RF) module, which communicates with the Internet in a wireless manner.

Specifically, the memory 1003 is configured to store an application program.

The processor 1001 may invoke, by using the transmission apparatus 1005, the application program stored in the memory 1003, to perform the following steps:

obtaining a first image and a second image, the first image being an image obtained by shooting a target scene under visible light, and the second image being an image obtained by shooting the target scene under infrared;

determining a predicted infrared intensity value corresponding to a pixel point in the first image through a prediction model, optionally, the prediction model being a model obtained through training by using a group of third images shot under the visible light as an input of the model and using a group of fourth images shot under the infrared as an output of the model, and the group of third images and the group of fourth images being images of the same scene;

obtaining a difference between an actual infrared intensity value of a pixel point in the second image and the predicted infrared intensity value corresponding to the pixel point at the same location in the first image; and determining a pixel point in the second image of which the difference is greater than a first threshold as a pixel point at which the target object in the target scene is located.

The processor 1001 is further configured to perform the following steps:

obtaining the group of third images and the group of fourth images obtained by shooting the target scene;

training an original model by using an image of the group of third images as an input of the original model frame by frame and by using an image of the same frame of the group of fourth images as an output of the original model;

using the original model after the training as the prediction model, in a case that a test image shot under the visible light is used as an input of the original model after the training, and a predicted image outputted by the original model matches a verification image shot under the infrared, the test image and the verification image being images of the target scene; or training the original model by continuing to use the image of the group of third images as the input of the original model and by using the image of the same frame of the group of fourth images as the output of the original model, in a case that the test image is used as the input of the original model after the training, and the predicted image outputted by the original model does not match the verification image, until the predicted image outputted by the original model after the training matches the verification image.

According to this embodiment of this application, by means of "obtaining a first image and a second image, the first image being an image obtained by shooting a target scene under visible light, and the second image being an image obtained by shooting the target scene under infrared; determining a predicted infrared intensity value corresponding to a pixel point in the first image through a prediction model, the prediction model being a model obtained through training by using a group of third images shot under the visible light as an input of the model and using a group of fourth images shot under the infrared as an output of the model, and the group of third images and the group of fourth images being images of the same scene; obtaining a difference between an actual infrared intensity value of a pixel point in the second image and the predicted infrared intensity value corresponding to the pixel point at the same location in the first image; and determining a pixel point in the second image of which the difference is greater than a first threshold as a pixel point at which the target object in the target scene is located", by using adaptive function reconstruction, a non-linear prediction model used for representing a background of a target scene can be effectively built, information about infrared light and about visible light can be effectively fused, shadow interference and the infrared halo effect can be suppressed, and background clutters can be suppressed to highlight the target, so that the technical problem of relatively low accuracy of target object recognition in the related art can be resolved, and further, the target object can still be accurately recognized in a case of interference.

Optionally, for a specific example in this embodiment, refer to the examples described in the foregoing embodiment. Details are not described herein again in this embodiment.

A person of ordinary skill in the art may understand that, the structure shown in FIG. 10 is only exemplary. The terminal may be a terminal device such as a smartphone (such as an Android mobile phone or an iOS mobile phone), a tablet computer, a palmtop computer, a mobile Internet device (MID), or a PAD. FIG. 10 does not limit the structure of the foregoing electronic device. For example, the terminal may further include more or fewer components (such as a network interface and a display apparatus) than those shown in FIG. 10, or may have a configuration different from that shown in FIG. 10.

A person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

An embodiment of this application further provides a storage medium. Optionally, in this embodiment, the storage medium may be configured to store program code for performing a target object recognition method.

Optionally, in this embodiment, the storage medium may be located on at least one of a plurality of network devices in the network described in the foregoing embodiment.

Optionally, in this embodiment, the storage medium is configured to store program code for performing the following steps:

obtaining a first image and a second image, the first image being an image obtained by shooting a target scene under visible light, and the second image being an image obtained by shooting the target scene under infrared;

determining a predicted infrared intensity value corresponding to a pixel point in the first image through a prediction model, optionally, the prediction model being a model obtained through training by using a group of third images shot under the visible light as an input of the model and using a group of fourth images shot under the infrared as an output of the model, and the group of third images and the group of fourth images being images of the same scene;

obtaining a difference between an actual infrared intensity value of a pixel point in the second image and the predicted infrared intensity value corresponding to the pixel point at the same location in the first image; and determining a pixel point in the second image of which the difference is greater than a first threshold as a pixel point at which the target object in the target scene is located.

Optionally, the storage medium is further configured to store program code for performing the following steps:

obtaining the group of third images and the group of fourth images obtained by shooting the target scene;

training an original model by using an image of the group of third images as an input of the original model frame by frame and by using an image of the same frame of the group of fourth images as an output of the original model;

using the original model after the training as the prediction model, in a case that a test image shot under the visible light is used as an input of the original model after the training, and a predicted image outputted by the original model matches a verification image shot under the infrared, the test image and the verification image being images of the target scene; or training the original model by continuing to use the image of the group of third images as the input of the original model and by using the image of the same frame of the group of fourth images as the output of the original model, in a case that the test image is used as the input of the original model after the training, and the predicted image outputted by the original model does not match the verification image, until the predicted image outputted by the original model after the training matches the verification image.

An embodiment of this application further provides a computer program product including instructions, the computer program product, when run on a server, causing the server to perform the method according to the foregoing embodiments.

Optionally, for a specific example in this embodiment, refer to the examples described in the foregoing embodiment. Details are not described herein again in this embodiment.

Optionally, in this embodiment, the storage medium may include, but is not limited to, various media such as a USB flash drive, a ROM, a RAM, a removable hard disk, a magnetic disk, and an optical disc that can store the program code.

The sequence numbers of the foregoing embodiments of this application are merely for description purpose and do not indicate the preference of the embodiments.

When the integrated unit in the foregoing embodiments is implemented in the form of a software functional unit and sold or used as an independent product, the integrated unit may be stored in the foregoing computer-readable storage medium. Based on such an understanding, the technical solution of this application essentially, or a part contributing to the related art, or all or a part of the technical solution may be implemented in a form of a software product. The computer software product is stored in a storage medium and includes several instructions for instructing one or more computer devices (which may be a personal computer, a server, a network device, or the like) to perform all or some of the steps of the methods in the embodiments of this application.

In the foregoing embodiments of this application, descriptions of the embodiments have different emphases. As for parts that are not described in detail in one embodiment, reference can be made to the relevant descriptions of the other embodiments.

In the several embodiments provided in this application, it is to be understood that the disclosed client can be implemented in other manners. The apparatus embodiments described above are merely exemplary. For example, the division of the units is merely the division of logic functions, and can use other division manners during actual implementation. For example, a plurality of units or components can be combined, or can be integrated into another system, or some features can be omitted or not performed. In addition, the coupling, or direct coupling, or communication connection between the displayed or discussed components may be the indirect coupling or communication connection through some interfaces, units, or modules, and may be in electrical or other forms.

The units described as separate parts may or may not be physically separate. Parts displayed as units may or may not be physical units, and may be located in one position, or may be distributed on a plurality of network units. Some or all of the units can be selected according to actual requirements to achieve the objectives of the solutions in the embodiments.

In addition, functional units in the embodiments of this application can be integrated into one processing unit, or each of the units can exist alone physically, or two or more units are integrated into one unit. The foregoing integrated unit can be implemented in the form of hardware, or may be implemented in the form of a software function unit.

The foregoing descriptions are merely exemplary implementations of this application. A person of ordinary skill in the art may further make several improvements and refinements without departing from the principle of this application, and the improvements and refinements shall fall within the protection scope of this application.

What is claimed is:

1. A target object recognition method, performed by a computer device having a processor and memory storing a plurality of programs to be executed by the processor, the method comprising:

obtaining a first image and a second image, the first image being an image obtained by shooting a target scene under visible light, the second image being an image obtained by shooting the target scene under infrared;

determining, using a prediction model, a plurality of predicted infrared intensity values for pixel points in the first image;

determining differences between the plurality of predicted infrared intensity values and a plurality of actual infrared intensity values of corresponding pixel points in the second image; and identifying a pixel point of a target object located in the target scene, the pixel point of the target object having a difference between the predicted infrared intensity value in the first image and the actual infrared intensity value in the second image greater than a first threshold.

2. The method according to claim 1, wherein the determining the plurality of predicted infrared intensity values comprises:

obtaining a color value of a pixel point in the first image; and determining the predicted infrared intensity value of the pixel point in the first image by applying the color value of the pixel point to multiple predefined prediction functions in the prediction model.

3. The method according to claim 2, wherein the obtaining a color value of the pixel point in the first image comprises:

converting a color type of the pixel point in the first image into a color type based on a physiological characteristic; and obtaining a color value of a first color channel and a color value of a second color channel of the pixel point in the first image after the color type conversion.

4. The method according to claim 1, wherein the prediction model is a model obtained through training by using a group of third images shot of a scene under the visible light as an input of the model and a group of fourth images shot of the same scene under the infrared as an output of the model.

5. The method according to claim 4, further comprising:
before determining the predicted infrared intensity value of the pixel point in the first image through the prediction model:
obtaining the group of third images and the group of fourth images obtained by shooting the target scene;
training an original model by using an image of the group of third images as an input of the original model frame by frame and by using an image of the same frame of the group of fourth images as an output of the original model;
using the original model after the training as the prediction model, in a case that a test image shot under the visible light is used, by the processing device, as an input of the original model after the training and a predicted image outputted by the original model matches a verification image shot under the infrared, the test image and the verification image being images of the target scene; or
training the original model by continuing to use the image of the group of third images as the input of the original model and by using the image of the same frame of the group of fourth images as the output of the original model, in a case that the test image is used, by the processing device, as the input of the original model after the training, and the predicted image outputted by the original model does not match the verification image, until the predicted image outputted by the original model after the training matches the verification image.

6. The method according to claim 5, wherein the training an original model by using an image of the group of third images as an input of the original model frame by frame and by using an image of the same frame of the group of fourth images as an output of the original model comprises:
inputting a color value of a pixel point in the third image into the original model, and using an intensity value of a pixel point in the fourth image of the same frame as the output of the original model, the color value of the pixel point in the third image being used as an input of a plurality of prediction functions of the original model, and the output of the original model being a cumulative sum of products of all of the plurality of prediction functions and corresponding weights; and
initializing the weights corresponding to the prediction functions and parameters inside the prediction functions, to complete training the original model by using the color value of the pixel point in the third image and the intensity value of the pixel point in the fourth image of the same frame.

7. The method according to claim 1, wherein identifying the pixel point of a target object comprises:
traversing each pixel point in the second image;
setting an intensity value of the pixel point in the second image of which the difference between the predicted infrared intensity value in the first image and the actual infrared intensity value in the second image is greater than the first threshold as a second threshold;
setting a second intensity value of a second pixel point in the second image of which the difference between the predicted infrared intensity value in the first image and the actual infrared intensity value in the second image is not greater than the first threshold as a third threshold, the second threshold and the third threshold being different thresholds; and
describing the target object through the pixel point in the second threshold after traversing all the pixel points in the second image.

8. The method according to claim 1, wherein the obtaining a first image and a second image comprises:
obtaining the first image obtained by shooting the target scene under the visible light and the second image obtained by shooting the target scene under the infrared simultaneously.

9. An electronic device, comprising a memory, a processor, and a plurality of computer programs stored in the memory that, when executed by the processor, cause the electronic device to perform a plurality of operations including:
obtaining a first image and a second image, the first image being an image obtained by shooting a target scene under visible light, the second image being an image obtained by shooting the target scene under infrared;
determining, using a prediction model, a plurality of predicted infrared intensity values for pixel points in the first image;
determining differences between the plurality of predicted infrared intensity values of and a plurality of actual infrared intensity values of corresponding pixel points in the second image; and
identifying a pixel point of a target object located in the target scene, the pixel point of the target object having a difference between the predicted infrared intensity value in the first image and the actual infrared intensity value in the second image greater than a first threshold.

10. The electronic device according to claim 9, wherein the determining the plurality of predicted infrared intensity values comprises:
obtaining a color value of a pixel point in the first image; and
determining the predicted infrared intensity value of the pixel point in the first image by applying the color value of the pixel point to multiple predefined prediction functions in the prediction model.

11. The electronic device according to claim 10, wherein the obtaining a color value of the pixel point in the first image comprises:
converting a color type of the pixel point in the first image into a color type based on a physiological characteristic; and
obtaining a color value of a first color channel and a color value of a second color channel of the pixel point in the first image after the color type conversion.

12. The electronic device according to claim 9, wherein the prediction model is a model obtained through training by using a group of third images shot of a scene under the visible light as an input of the model and a group of fourth images shot of the same scene under the infrared as an output of the model.

13. The electronic device according to claim 12, wherein the plurality of operations further comprise:
before determining the predicted infrared intensity value of the pixel point in the first image through the prediction model:
obtaining the group of third images and the group of fourth images obtained by shooting the target scene;
training an original model by using an image of the group of third images as an input of the original model frame by frame and by using an image of the same frame of the group of fourth images as an output of the original model;

using the original model after the training as the prediction model, in a case that a test image shot under the visible light is used, by the processing device, as an input of the original model after the training and a predicted image outputted by the original model matches a verification image shot under the infrared, the test image and the verification image being images of the target scene; or training the original model by continuing to use the image of the group of third images as the input of the original model and by using the image of the same frame of the group of fourth images as the output of the original model, in a case that the test image is used, by the processing device, as the input of the original model after the training, and the predicted image outputted by the original model does not match the verification image, until the predicted image outputted by the original model after the training matches the verification image.

14. The electronic device according to claim 13, wherein the training an original model by using an image of the group of third images as an input of the original model frame by frame and by using an image of the same frame of the group of fourth images as an output of the original model comprises:

inputting a color value of a pixel point in the third image into the original model, and using an intensity value of a pixel point in the fourth image of the same frame as the output of the original model, the color value of the pixel point in the third image being used as an input of a plurality of prediction functions of the original model, and the output of the original model being a cumulative sum of products of all of the plurality of prediction functions and corresponding weights; and initializing the weights corresponding to the prediction functions and parameters inside the prediction functions, to complete training the original model by using the color value of the pixel point in the third image and the intensity value of the pixel point in the fourth image of the same frame.

15. The electronic device according to claim 9, wherein identifying the pixel point of a target object comprises:

traversing each pixel point in the second image;

setting an intensity value of the pixel point in the second image of which the difference between the predicted infrared intensity value in the first image and the actual infrared intensity value in the second image is greater than the first threshold as a second threshold;

setting a second intensity value of a second pixel point in the second image of which the difference between the predicted infrared intensity value in the first image and the actual infrared intensity value in the second image is not greater than the first threshold as a third threshold, the second threshold and the third threshold being different thresholds; and describing the target object through the pixel point in the second threshold after traversing all the pixel points in the second image.

16. The electronic device according to claim 9, wherein the obtaining a first image and a second image comprises:

obtaining the first image obtained by shooting the target scene under the visible light and the second image obtained by shooting the target scene under the infrared simultaneously.

17. A non-transitory computer-readable storage medium, storing computer-readable instructions that, when executed by a processor of an electronic device, cause the electronic device to perform a plurality of operations including:

obtaining a first image and a second image, the first image being an image obtained by shooting a target scene under visible light, the second image being an image obtained by shooting the target scene under infrared;

determining, using a prediction model, a plurality of predicted infrared intensity values for pixel points in the first image;

determining differences between the plurality of predicted infrared intensity values and a plurality of actual infrared intensity values of corresponding pixel points in the second image; and identifying a pixel point of a target object located in the target scene, the pixel point of the target object having a difference between the predicted infrared intensity value in the first image and the actual infrared intensity value in the second image greater than a first threshold.

18. The non-transitory computer-readable storage medium according to claim 17, wherein the determining the plurality of predicted infrared intensity values comprises:

obtaining a color value of a pixel point in the first image; and determining the predicted infrared intensity value of the pixel point in the first image by applying the color value of the pixel point to multiple predefined prediction functions in the prediction model.

19. The non-transitory computer-readable storage medium according to claim 17, wherein the prediction model is a model obtained through training by using a group of third images shot of a scene under the visible light as an input of the model and a group of fourth images shot of the same scene under the infrared as an output of the model.

20. The non-transitory computer-readable storage medium according to claim 17, wherein identifying the pixel point of a target object comprises:

traversing each pixel point in the second image;

setting an intensity value of the pixel point in the second image of which the difference between the predicted infrared intensity value in the first image and the actual infrared intensity value in the second image is greater than the first threshold as a second threshold;

setting a second intensity value of a second pixel point in the second image of which the difference between the predicted infrared intensity value in the first image and the actual infrared intensity value in the second image is not greater than the first threshold as a third threshold, the second threshold and the third threshold being different thresholds; and describing the target object through the pixel point in the second threshold after traversing all the pixel points in the second image.

* * * * *